(12) United States Patent
Pinheiro et al.

(10) Patent No.: US 11,645,505 B2
(45) Date of Patent: May 9, 2023

(54) METHOD AND SYSTEM FOR GENERATING A VECTOR REPRESENTATION OF AN IMAGE

(71) Applicant: ELEMENT AI Inc., Montreal (CA)

(72) Inventors: Pedro Oliveira Pinheiro, Montreal (CA); Chen Xing, Montreal (CA); Negar Rostamzadeh, Montreal (CA)

(73) Assignee: ServiceNow Canada Inc., Montreal (CA)

( * ) Notice: Subject to any disclaimer, the term of this patent is extended or adjusted under 35 U.S.C. 154(b) by 217 days.

(21) Appl. No.: 16/746,157

(22) Filed: Jan. 17, 2020

(65) Prior Publication Data

US 2021/0224612 A1 Jul. 22, 2021

(51) Int. Cl.
*G06K 9/62* (2022.01)
*G06N 3/08* (2006.01)

(52) U.S. Cl.
CPC .......... *G06K 9/6269* (2013.01); *G06K 9/628* (2013.01); *G06K 9/6256* (2013.01); *G06N 3/08* (2013.01)

(58) Field of Classification Search
CPC .. G06K 9/6269; G06K 9/6215; G06K 9/6267; G06K 9/6232; G06K 9/629; G06K 9/6228; G06K 9/6274; G06K 9/6259; G06K 9/6256; G06K 9/628; G06K 9/6273; G06N 3/08; G06N 3/0454; G06N 3/084; G06N 3/0445; G06N 3/088; G06N 20/00; G06V 10/454; G06V 10/768; G06V 10/40; G06V 10/751; G06V 10/82; G06V 20/41; G06V 20/70; G06V 20/46; G06T 2207/20084; G06T 2207/20081; G06T 7/11; G06F 40/30; G06F 16/583; G06F 16/532; G06F 16/58; G06F 16/3334; G06F 16/538
See application file for complete search history.

(56) References Cited

U.S. PATENT DOCUMENTS

| | | | |
|---|---|---|---|
| 10,248,889 B2* | 4/2019 | Dua | G06V 10/42 |
| 2016/0055237 A1* | 2/2016 | Tuzel | G06K 9/6282 |
| | | | 382/224 |
| 2017/0083752 A1* | 3/2017 | Saberian | G06N 3/0454 |
| 2017/0132526 A1 | 5/2017 | Cohen et al. | |
| 2018/0268548 A1* | 9/2018 | Lin | G06N 3/0454 |
| 2019/0087686 A1* | 3/2019 | Du | G06K 9/6232 |
| 2019/0108446 A1* | 4/2019 | Lyu | G06F 16/56 |
| 2019/0243739 A1* | 8/2019 | Song | G06F 16/2474 |
| 2019/0335192 A1* | 10/2019 | Otto | H04N 19/172 |
| 2019/0370666 A1* | 12/2019 | Ros Sanchez | G06N 3/084 |

(Continued)

*Primary Examiner* — Michael S Osinski
(74) *Attorney, Agent, or Firm* — Fasken Martineau Dumoulin LLP; Serge Lapointe

(57) ABSTRACT

There is described a computer-implemented method for generating a vector representation of an image, the computer-implemented method comprising: receiving a given image and semantic information about the given image; generating a first vector representation of the given image using an image embedding method; generating a second vector representation of the semantic information using a word embedding method; combining the first vector representation of the image to be embedded and the second vector representation of the semantic information together, thereby obtaining a modified vector representation for the image to be embedded; and outputting the modified vector representation.

14 Claims, 10 Drawing Sheets

(56) References Cited

U.S. PATENT DOCUMENTS

| | | | | |
|---|---|---|---|---|
| 2020/0057925 | A1* | 2/2020 | Tang | G06K 9/6215 |
| 2020/0090003 | A1* | 3/2020 | Marques | G06F 17/18 |
| 2020/0097820 | A1* | 3/2020 | Song | G06N 3/0454 |
| 2020/0110930 | A1* | 4/2020 | Simantov | G06V 30/412 |
| 2020/0193206 | A1* | 6/2020 | Turkelson | G06K 9/6256 |
| 2020/0250461 | A1* | 8/2020 | Yang | G06T 7/11 |
| 2020/0257922 | A1* | 8/2020 | Huang | G06K 9/6215 |
| 2020/0258241 | A1* | 8/2020 | Liu | G06V 10/82 |
| 2020/0320348 | A1* | 10/2020 | Yang | G06V 10/82 |
| 2020/0356592 | A1* | 11/2020 | Yada | G06V 20/20 |
| 2020/0380027 | A1* | 12/2020 | Aggarwal | G06F 16/3334 |
| 2021/0034919 | A1* | 2/2021 | Wu | G06V 30/274 |
| 2021/0117703 | A1* | 4/2021 | Ohgushi | G06T 7/73 |
| 2021/0124997 | A1* | 4/2021 | Kondou | G06V 40/169 |
| 2021/0150194 | A1* | 5/2021 | Wang | G06K 9/6215 |
| 2021/0192220 | A1* | 6/2021 | Qu | G06V 10/82 |
| 2021/0192393 | A1* | 6/2021 | Arai | G06N 20/00 |
| 2021/0201038 | A1* | 7/2021 | Xia | G06V 20/47 |
| 2021/0209782 | A1* | 7/2021 | Fang | G06T 3/40 |
| 2021/0224286 | A1* | 7/2021 | Wu | G06F 16/24578 |
| 2021/0241027 | A1* | 8/2021 | Hu | G06T 7/11 |
| 2021/0256588 | A1* | 8/2021 | Moosaei | G06Q 30/0631 |
| 2021/0349940 | A1* | 11/2021 | Chen | G06F 16/743 |
| 2021/0365726 | A1* | 11/2021 | Jie | G06V 10/758 |
| 2021/0366126 | A1* | 11/2021 | Chen | G06N 3/08 |
| 2022/0004719 | A1* | 1/2022 | Ozeki | G06V 10/40 |

\* cited by examiner

METHOD AND SYSTEM FOR GENERATING A VECTOR REPRESENTATION OF AN IMAGE

TECHNICAL FIELD

The present invention relates to the field of image embedding methods and systems and to image classification methods and system using image embedding.

BACKGROUND

Meta-learning or "learning to learn" is a problem that has a prominent history in the field. Due to advances in representation learning methods and the creation of new few-shot learning datasets, many deep meta-learning approaches have been proposed to address the few-shot learning problem. These methods can be roughly divided into two main types: metric-based and gradient-based approaches.

Metric-based approaches aim at learning representations that minimize intra-class distances while maximizing the distance between different classes. These approaches tend to rely on an episodic training framework: the model is trained with sub-tasks (episodes) in which there are only a few training samples for each category. For example, matching networks follows a simple nearest neighbour framework. In each episode, it uses an attention mechanism (over the encoded support) as a similarity measure for one-shot classification.

In prototypical networks, a metric space is learned where embeddings of queries of one category are close to the centroid (or prototype) of supports of the same category, and far away from centroids of other classes in the episode. Due to simplicity and performance of this approach, many methods extended this work. For instance, Ren et al. (2018) propose a semi-supervised few-shot learning approach and show that leveraging unlabeled samples out-perform purely supervised prototypical networks. It has been proposed to augment the support set by generating hallucinated examples. Task-dependent adaptive metric (TADAM) relies on conditional batch normalization to provide task adaptation (based on task representations encoded by visual features) to learn a task-dependent metric space.

Gradient-based meta-learning methods aim at training models that can quickly adapt to new tasks. They use a support set to update the model in order to generalize to the query set. Most these methods are built on top of model-agnostic meta-learning (MAML) framework. Given the universality of MAML, many follow-up works were recently proposed to improve its performance on few-shot learning. It has been proposed a probabilistic extension to MAML trained with variational approximation. Conditional class-aware meta-learning (CAML) conditionally transforms embeddings based on a metric space that is trained with prototypical networks to capture inter-class dependencies. Latent embedding optimization (LEO) aims to tackle MAML's problem of only using a few updates on a low data regime to train models in a high dimensional parameter space. The model employs a low-dimensional latent model embedding space for update and then decodes the actual model parameters from the low-dimensional latent representations. This simple yet powerful approach achieves current state of the art result in different few-shot classification benchmarks.

Other meta-learning approaches for few-shot learning include using memory architecture to either store exemplar training samples or to directly encode fast adaptation algorithm. Temporal convolution has also been used to achieve the same goal.

Current approaches mentioned above rely solely on visual features for few-shot classification and presents some limitations.

Zero-shot learning aims at recognizing objects whose instance have not been seen during training. Classic approaches to this problem encode classes with a set of numeric attributes. Some methods use label semantic features in zero-shot learning. They transform visual features into semantic space and force this transformation to keep the same structure as that of the semantic space (pre-trained on text corpora). More recently, it has been proposed a method that uses maximum mean discrepancy MMD to learn joint embeddings for semantic and visual feature. These embeddings are then used to perform zero and few-shot learning. It has also been proposed a GAN-based approach to generate visual features conditioned on semantic label as a means of mapping a label to a distribution of visual features (conditioned on the label). It has further been proposed a method that encodes information from both sides using two VAEs and adding regularization to align the two latent spaces.

Because zero-shot learning does not have access to any visual feature support, these joint-embedding approaches are reasonable. The model has no choice but to force the visual representation space to have the same structure as the semantic space. This way during test, the image query's similarity with the semantic information from candidate classes can be computed for classification. However, this explicit visual-semantic alignment may be harmful when we have access to labeled samples. Therefore, forcing visual and semantic spaces having different structures to align blindly may result in information loss in both modalities, ultimately weakening both of them.

Therefore, there is a need for an improved method and system for generating vector representation of images and for classifying images.

SUMMARY

According to a first broad aspect, there is provided a computer-implemented method for generating a vector representation of an image, the computer-implemented method comprising: receiving a given image and semantic information about the given image; generating a first vector representation of the given image using an image embedding method; generating a second vector representation of the semantic information using a word embedding method; combining the first vector representation of the image to be embedded and the second vector representation of the semantic information together, thereby obtaining a modified vector representation for the image to be embedded; and outputting the modified vector representation.

In one embodiment, the step of generating the first vector representation of the given image is performed using a convolutional neural network model.

In one embodiment, the step of generating the second vector representation is performed using a language model being pre-trained on unsupervised text corpora.

In one embodiment, the step of generating the second vector representation of the semantic information is performed using a fully connected neural network model.

In one embodiment, the step of combining comprises performing a convex combination of the first vector representation of the image to be embedded and the second vector representation of the semantic information.

In one embodiment, the method further comprises, when the second vector representation does not lie on a dimensional space of the first vector representation, applying a transformation to the second vector representation of the semantic information to obtain a transformed vector representation of the semantic information, the transformed vector representation lying on the dimensional space of the first vector representation, said combining comprising combining the first vector representation and the transformed vector representation together.

In one embodiment, the step of applying the transformation is performed using a fully connected neural network model.

According to another broad aspect, there is provided a computer-implemented method for classifying an image amongst predefined image categories, the computer-implemented method comprising: receiving an image to be classified; generating a vector representation of the image to be classified using an image embedding method; comparing the vector representation of the image to predefined vector representations of the predefined image categories; identifying a relevant category amongst the predefined image categories based on the comparison, thereby associating the image to be classified to the relevant category; and outputting the relevant category, wherein for each one of the predefined image categories, the predefined vector representation is obtained by: receiving at least one reference image associated with the predefined image category; receiving semantic information about the predefined image category; generating a first vector representation of the at least one reference image using an image embedding method; generating a second vector representation of the semantic information using a word embedding method; and combining the first vector representation and the second vector representation, thereby obtaining the predefined vector representation.

In one embodiment, the step of generating the first vector representation is performed using a convolutional neural network model.

In one embodiment, the step of generating the second vector representation is performed using a language model being pre-trained on unsupervised text corpora.

In one embodiment, the step of generating the second vector representation of the semantic information is performed using a fully connected neural network model.

In one embodiment, the step of said combining comprises performing a convex combination of the first vector representation of the image to be embedded and the second vector representation of the semantic information.

In one embodiment, the step of receiving at least one reference image comprises receiving at least two reference images each associated with the predefined image category; and the step of generating the first vector representation comprises: generating a vectorial representation for each one of the at least two reference images using the image embedding method; and averaging the vectorial representations, thereby obtaining the first vector representation.

In one embodiment, the method further comprises, when the second vector representation does not lie on a dimensional space of the first vector representation, applying a transformation to the second vector representation of the semantic information to obtain a transformed vector representation of the semantic information, the transformed vector representation lying on the dimensional space of the first vector representation, said combining comprising combining the first vector representation and the transformed vector representation together.

In one embodiment, the step of applying the transformation is performed using a fully connected neural network model.

According to a further broad aspect, three is provided a system for generating a vector representation of an image, the system comprising: a first generator for receiving a given image and generating a first vector representation of the given image using an image embedding method; a second generator for receiving semantic information about the given image and generating a second vector representation of the semantic information using a word embedding method; a combiner for combining the first vector representation of the image to be embedded and the second vector representation of the semantic information together to obtain a modified vector representation for the image to be embedded and outputting the modified vector representation.

In one embodiment, the first generator comprises a convolutional neural network.

In one embodiment, the second generator is configured for generating the second vector representation using a language model being pre-trained on unsupervised text corpora.

In one embodiment, the second generator comprises a fully connected neural network.

In one embodiment, the combiner is configured for performing a convex combination of the first vector representation of the image to be embedded and the second vector representation of the semantic information to obtain the modified vector representation.

In one embodiment, the system further comprises a transformer for, when the second vector representation does not lie on a dimensional space of the first vector representation, applying a transformation to the second vector representation of the semantic information to obtain a transformed vector representation of the semantic information, the transformed vector representation lying on the dimensional space of the first vector representation, the combiner being configured for combining the first vector representation and the transformed vector representation together.

In one embodiment, the transformer comprises a fully connected neural network.

According to still another broad aspect, there is provided a system for classifying an image amongst predefined image categories, the system comprising: a database containing predefined vector representations of the predefined image categories; an embedding unit for receiving an image to be classified and generating a vector representation of the image to be classified using an image embedding method; a comparison unit for comparing the vector representation of the image to predefined vector representations of the predefined image categories and identifying a relevant category amongst the predefined image categories based on the comparison, the relevant category being associated with the image to be classified and outputting the relevant category, wherein for each one of the predefined image categories, the predefined vector representation is generated using: the embedding unit for receiving at least one reference image associated with the predefined image category and generating a first vector representation of the at least one reference image; a vector generator configured for receiving semantic information about the predefined image category and generating a second vector representation of the semantic information using a word embedding method; and a combiner for combining the first vector representation and the second vector representation to obtain the predefined vector representation.

In one embodiment, the embedding unit comprises a convolutional neural network.

In one embodiment, the vector generator is configured for generating the second vector representation of the semantic information using a language model being pre-trained on unsupervised text corpora.

In one embodiment, the vector generator comprises a fully connected neural network.

In one embodiment, the combiner is configured for performing a convex combination of the first vector representation and the second vector representation to obtain the predefined vector representation.

In one embodiment, the at least one reference image comprises at least two reference images each associated with the predefined image category, the embedding unit being further configured for: generating a vectorial representation for each one of the at least two reference images using the image embedding method; and averaging the vectorial representations to obtain the first vector representation.

In one embodiment, the system further comprises a transformer for, when the second vector representation does not lie on a dimensional space of the first vector representation, applying a transformation to the second vector representation of the semantic information to obtain a transformed vector representation of the semantic information, the transformed vector representation lying on the dimensional space of the first vector representation, the combiner being configured for combining the first vector representation and the transformed vector representation together.

In one embodiment, the transformer comprises a fully connected neural network.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
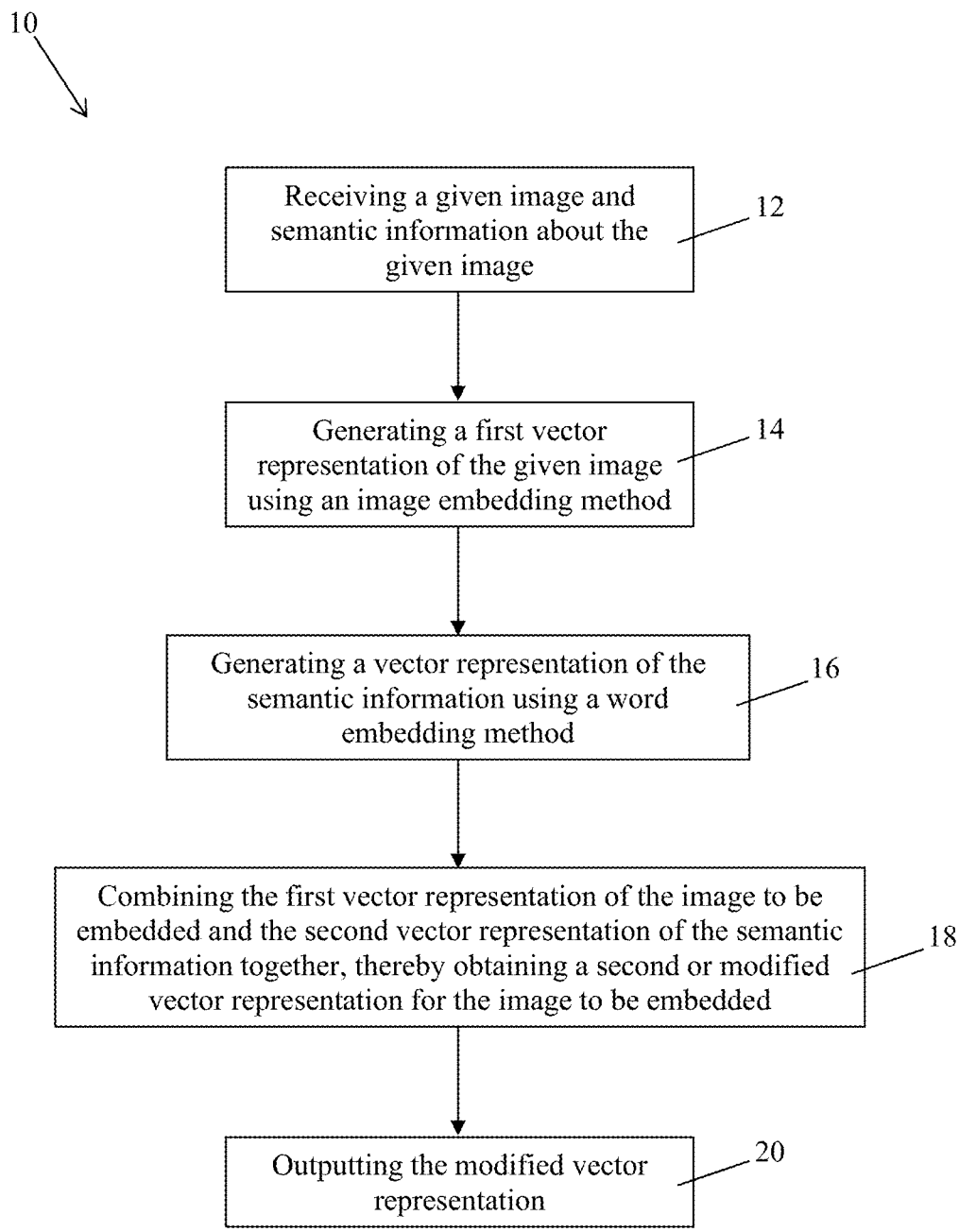
FIG. 1 is a flow chart illustrating a method for generating a vector representation of an image, in accordance with an embodiment.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

In the following, there is described a computer-implemented method for generating a vector representation of an image using both an image embedding method and a word embedding method. The image embedding method is used for generating a first vector representation for the image while the word embedding method is used for generating a vector representation of semantic information describing the image, i.e. describing what is represented within the image. The first vector representation of the image and the vector representation of the semantic information are combined together to obtain a second vector representation for the image. The second vector representation of the image may be seen as an improved vector representation for the image relative to the first vector representation and the present method may be seen as an improvement of the image embedding method used for generating the first vector representation of the image.

In one embodiment, the present method is particularly useful in the context of few-shot learning as better explained below.

The present method for generating vector representation of an image may be used for generating reference vector representations associated with categories of images. In order to classify a given image, i.e. in order to determine to which category the given image belongs, a vector representation of the given image is generated and compared to the reference vector representations. The comparison consists in determining the distance between the vector representation of the given image and the vector representation associated with each category. The shortest distance indicates the category to which the given image belongs.

FIG. 1 illustrates one embodiment of a computer-implemented method 10 for generating a vector representation of an image. The method 10 may be executed by electronic device such as a server, or a plurality of electronic devices such as a plurality of servers.

At step 12, an image for which a vector representation is desired is received. It should be understood that the image may be a drawing, a picture, etc. At step 12, semantic information about the image is also received. The semantic information describes the image, i.e., it describes what is shown in the image, and comprises at least one word. In one embodiment, the semantic information comprises a plurality of words each describing what is represented in the image.

At step 14, a first vector representation of the image received at step 12 is generated using a given image embedding method. It should be understood that the given image embedding method may be any adequate image embedding method. In one embodiment, the first vector representation of the image is generated a convolutional neural network model. In another embodiment, image embedding methods such as scale-invariant feature transform, histogram of oriented gradients, speeded up robust features, or the like may be used.

At step 16, a vector representation of the semantic information is generated using a word embedding method. It should be understood that any adequate word embedding method may be used. In one embodiment, the word embedding method is a language model pre-trained on unsupervised large text corpora. For example, a fully connected neural network model such as GLoVe may be used. In another example, word2vec, fasttext, AllenNLP's Elmo, Gensim, or the like may be used.

At step 18, the first vector representation of the image generated at step 14 and the vector representation of the semantic information generated at step 16 are combined together to obtain a second or modified vector representation of the image. In one embodiment, the step 18 consists in a convex combination of the first vector representation of the image and the vector representation of the semantic information, as described in greater detail below.

At step 20, the modified vector representation of the image is outputted. For example, the modified vector representation of the image may be stored in memory. In the same or another example, the modified vector representation of the image may be transmitted to another electronic device.

In an embodiment in which the first vector representation of the image and the vector representation of the semantic information do not lie on the same dimensional space, the method 10 further comprises a step of applying at least one transformation so that both the vector representation of the image and the vector representation of the semantic information lie on the same dimensions space. In one embodiment, the dimensional space of the first vector representation of the image is the reference dimensional space and a transformation is applied to the vector representation of the semantic information to obtain a modified vector representation of the semantic information that lies on the reference dimensional space, i.e. on the same dimensional space as that of the first vector representation of the image. In another embodiment, the dimensional space of the vector representation of the semantic information is the reference dimensional space and a transformation is applied to the first vector representation of the image to obtain a modified first vector representation of the image that lies on the reference dimensional space, i.e. on the same dimensional space as that of the vector representation of the semantic information. In a further embodiment, the reference dimensional space is different from the dimensional spaces of the first vector representation of the image and the vector representation of the semantic information. In this case, a first transformation is applied to the first vector representation of the image to obtain a modified first vector representation of the image that lies on the reference dimensional space and a second transformation is applied to the vector representation of the semantic information to obtain a modified vector representation of the semantic information that lies on the reference dimensional space.

In one embodiment, the modified vector representation of the image corresponds to a better representation of the image relative to the first vector representation of the image since it was generated using the first vector representation and semantic information describing what is represented in the image.

In one embodiment, the method 10 is particularly useful in the context of few-shot learning as better explained below.

Figure 2:
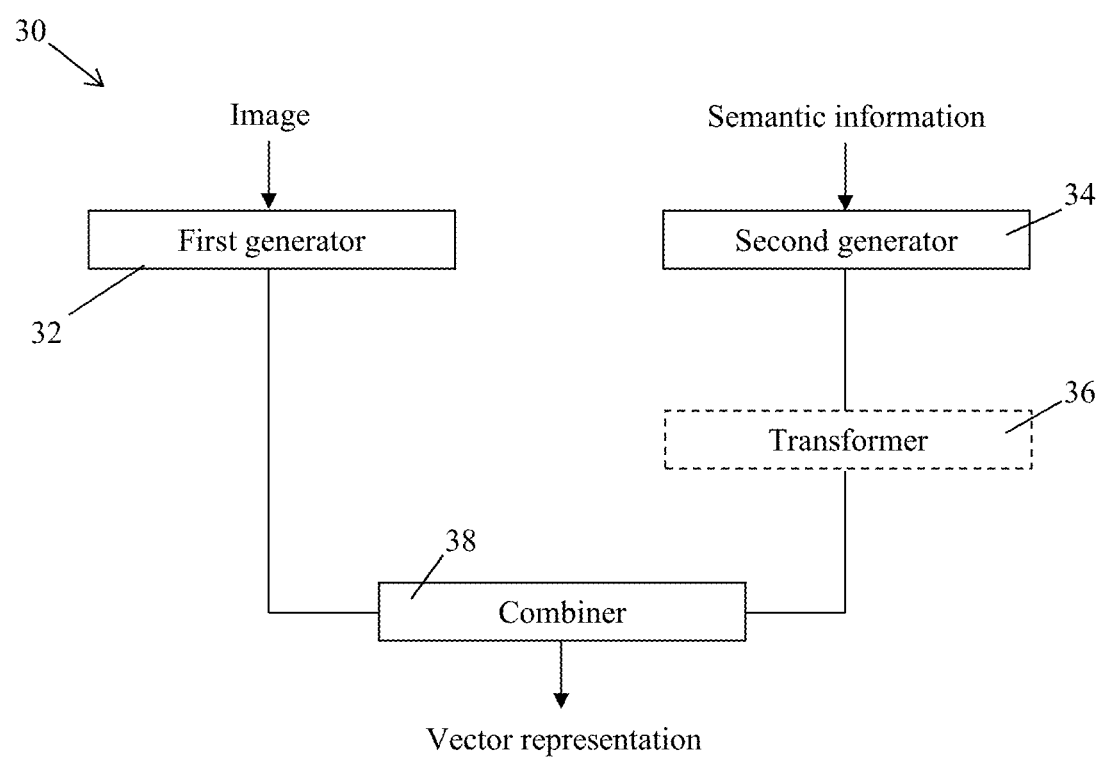
FIG. 2 is a block diagram illustrating a system for generating a vector representation of an image, in accordance with an embodiment.

FIG. 2 illustrates one embodiment of a system 30 for generating a vector representation of an image. The system 30 comprises a first generator 32, a second generator 34, an optional transformer 36 and a combiner 38.

The first generator 32 is configured for receiving an image for which a vector representation is desired and for generating a first vector representation of the received image. In one embodiment, the first generator 32 comprises a convolutional neural network as better described below.

The second generator 34 is configured for receiving semantic information describing what is represented in the image and for generating a vector representation of the semantic information. In one embodiment, the second generator 34 is configured for executing a language model pre-trained on unsupervised large text corpora. For example, the second generator 34 may comprise a fully connected neural network.

In an embodiment in which the transformer 36 is omitted and the first vector representation of the image and the vector representation of the semantic information lie on the same dimensional space, the first vector representation of the image and the vector representation of the semantic information are transmitted to the combiner 38. The combiner 38 is configured for combining together the first vector representation of the image and the vector representation of the semantic information to obtain a second or modified vector representation for the image. The combiner 38 is further configured for outputting the modified vector representation of the image. For example, the combiner may store the modified vector representation of the image into memory. In the same or another embodiment, the combiner 38 may transmit the modified vector representation of the image to an electronic device such as a server.

In one embodiment, the combiner 38 is configured for applying a convex combination of the first vector representation of the image and the vector representation of the semantic information.

In an embodiment in which the first vector representation of the image and the vector representation of the semantic information do not lie on the same dimensional space, the system 30 further comprises the transformer 36. The transformer 36 is configured for applying a transformation to the vector representation of the semantic information to obtain a modified vector representation of the semantic information that lies on the same dimensional space as that of the first vector representation of the image.

In this case, the transformer 36 is configured for transmitting the modified vector representation of the semantic information to the combiner 38. The combiner 38 then combines together the first vector representation of the image and the modified vector representation of the semantic information to obtain the modified vector representation of the image.

In another embodiment, the transformer 36 is located between the first generator 32 and the combiner 38. In this case, the transformer 36 is configured for transforming the first vector representation of the image into a second vector representation of the image that lies on the same dimensional space as that of the vector representation of the semantic information. The combiner 38 then combines together the second vector representation of the image received from the transformer and the vector representation of the semantic information received from the second generator 34 to obtain a modified vector representation of the image.

In a further embodiment, the system 30 further comprises an additional transformer located between the first generator 32 and the combiner 38 in addition to the transformer 36. In this case, the transformer 36 is configured for transforming the vector representation of the semantic information so as to obtain a second vector representation of the semantic information that lies on a reference dimensional space. The additional transformer is configured for transforming the first vector representation of the image so as to obtain a second vector representation of the image that lies on the reference dimensional space. The combiner is then configured for combining together the second vector representation of the image received from the additional transformer and the second vector representation of the sematic information received from the transformer 36 to obtain the modified vector representation of the image.

Figure 3:
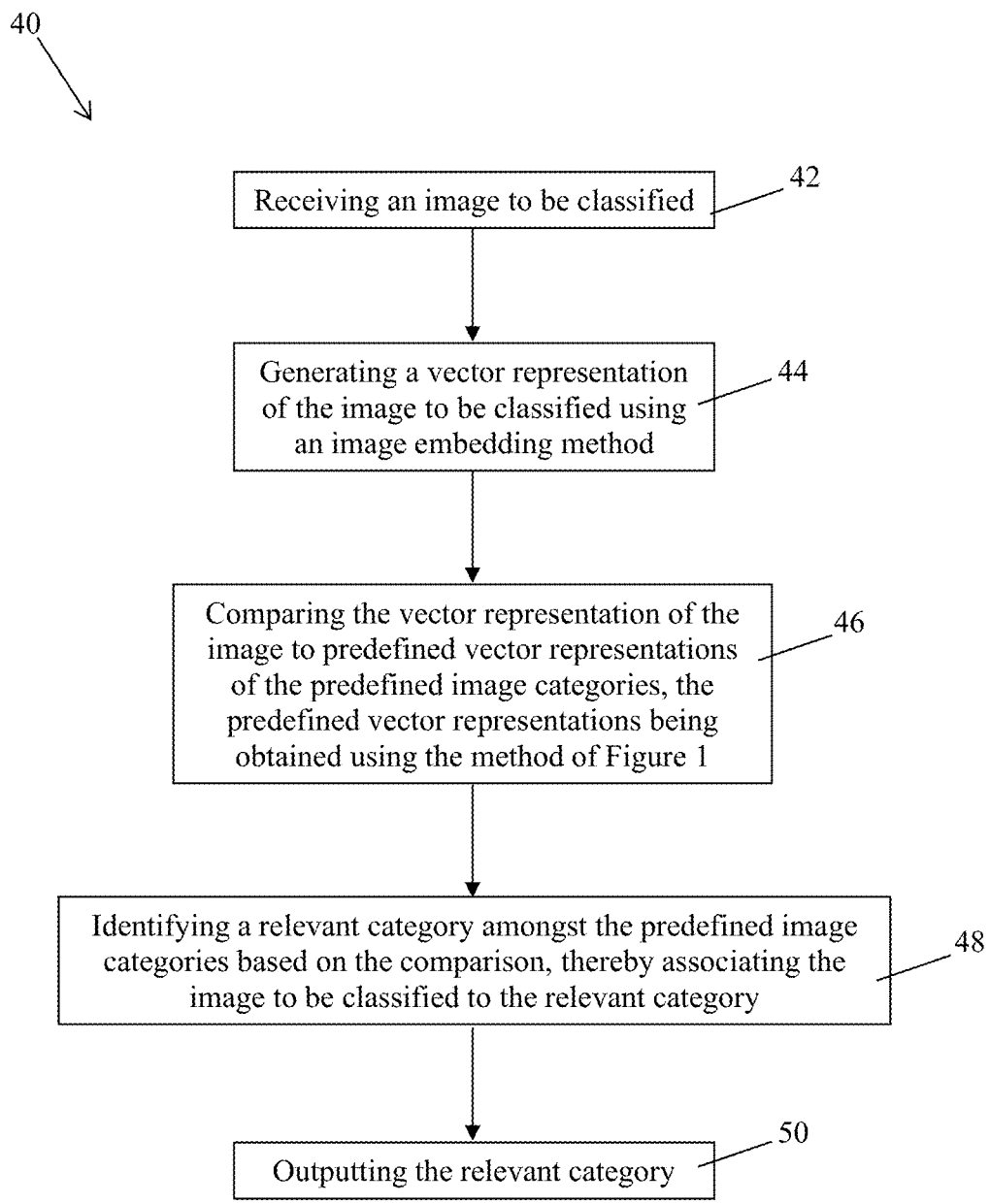
FIG. 3 is a flow chart illustrating a method for classifying an image, in accordance with an embodiment.

FIG. 3 illustrates one embodiment of a computer-implemented method 40 for classifying an image amongst a plurality of predefined image categories.

At step 42, an image to be classified is received.

At step 44, a vector representation of the received image is generated. In one embodiment, the same image embedding method as the one described at step 14 of the method 10 is used for generating the vector representation of the received image.

At step 46, the vector representation of the received image is compared to reference vector representations to obtain a comparison result. Each reference vector representation is associated with a respective one of the predefined image categories and is generated using the method 10. For each category, there is provided semantic information about the category and at least one reference image. For example, if there are two categories, e.g. cats and dogs, there is provided at least one image of a dog and semantic information about dogs (e.g. a written description of what a dog is) and at least one image of a cat and semantic information about cats (e.g., a written description of what a cat is).

If for a category there is only a single reference image, then a vector representation of the single reference image is generated and a vector representation of the semantic information about the category is also generated. The vector representation of the single reference image and the vector representation of the semantic information are combined together to obtain a modified vector representation of the single reference image which corresponds to the vector representation associated with the category.

If the vector representation of the single reference image and the vector representation of the semantic information do not lie on the same dimensional space, the vector representation of the semantic information is transformed to obtain a modified vector representation of the semantic information that lies on the same dimensional space of the vector representation of the single reference image. Then the vector presentation of the single reference image and the modified vector representation of the semantic information are combined together to obtain the vector representation for the category.

If for a category there are at least two reference images, then a vector representation is generated for each reference image and the thus-obtained vector representation are averaged to obtain an average vector representation. A vector representation of the semantic information about the category is also generated. The average vector representation and the vector representation of the semantic information are combined together to obtain a modified vector representation which corresponds to the vector representation associated with the category.

If the vector representation of a reference image and the vector representation of the semantic information do not lie on the same dimensional space, the vector representation of the semantic information is transformed to obtain a modified vector representation of the semantic information that lies on the same dimensional space of the vector representation of the single reference image. Then the average vector presentation and the modified vector representation of the semantic information are combined together to obtain the vector representation for the category.

In one embodiment, the comparison step 46 consists in determining the distance between the vector representation of the received image and each reference vector representation.

At step 48, the category to which the received image belongs is identified based on the comparison result obtained at step 46. If at step 46 distances between the vector representation of the received image and each reference vector representation have been determined, the category to which the received image belongs is identified as being the reference vector representation for which the distance is minimal.

At step 50, the identified category to which the received image belongs is outputted. For example, the identified category may be stored in memory.

Figure 4:
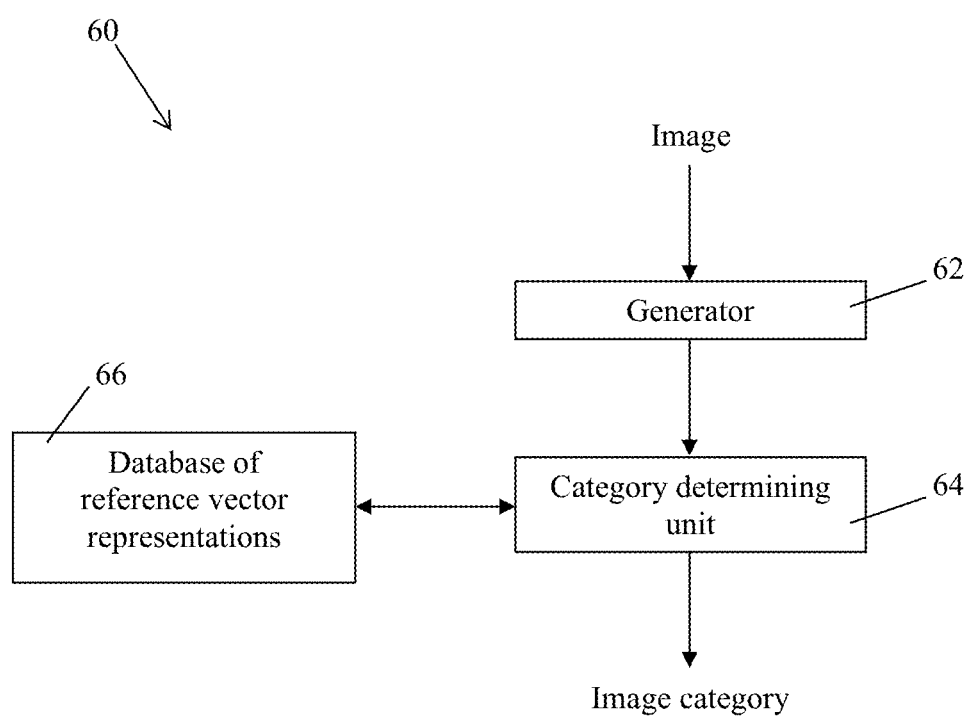
FIG. 4 is a block diagram illustrating a system for classifying an image, in accordance with an embodiment.

FIG. 4 illustrates one embodiment of a system 60 for assigning an image category to an image. The system comprises a generator 62, a category determining unit 64 and a database 66 stored on a memory. In one embodiment, the generator 62 corresponds to the first generator 32 of the system 30.

The generator 62 is configured for receiving an image to be classified, i.e. an image for which the category to which the image belongs has to be determined, and generating a vector representation of the received image. The vector representation of the received image is transmitted to the category determining unit 64.

The category determining unit 64 is configured for determining the image category of the received image and is in communication with the database 66. The database 66 comprises a plurality of a reference vector representations each associated with a respective image categories and the category determining unit 64 is configured for identifying the particular image category which should be assigned to the received image. The reference vector representations stored in the database 66 are generated using the above-described method using the generator 62 for generating vector representations of reference images for each category.

In one embodiment, the category determining unit 64 is configured for comparing the vector representation of the received image to the reference vector representations to obtain a comparison result and identifying the given category that corresponds to the received image based on the comparison result.

In one embodiment, the category determining unit 64 is configured for determining the distance between the vector representation of the received image and each reference vector representations and identifying the category to which the received image belongs as being the given category for which the determined distance is minimal.

In one embodiment, the system 30 further comprises an averaging unit for generating the average vector representation for each category using the above-described method.

Figure 5:
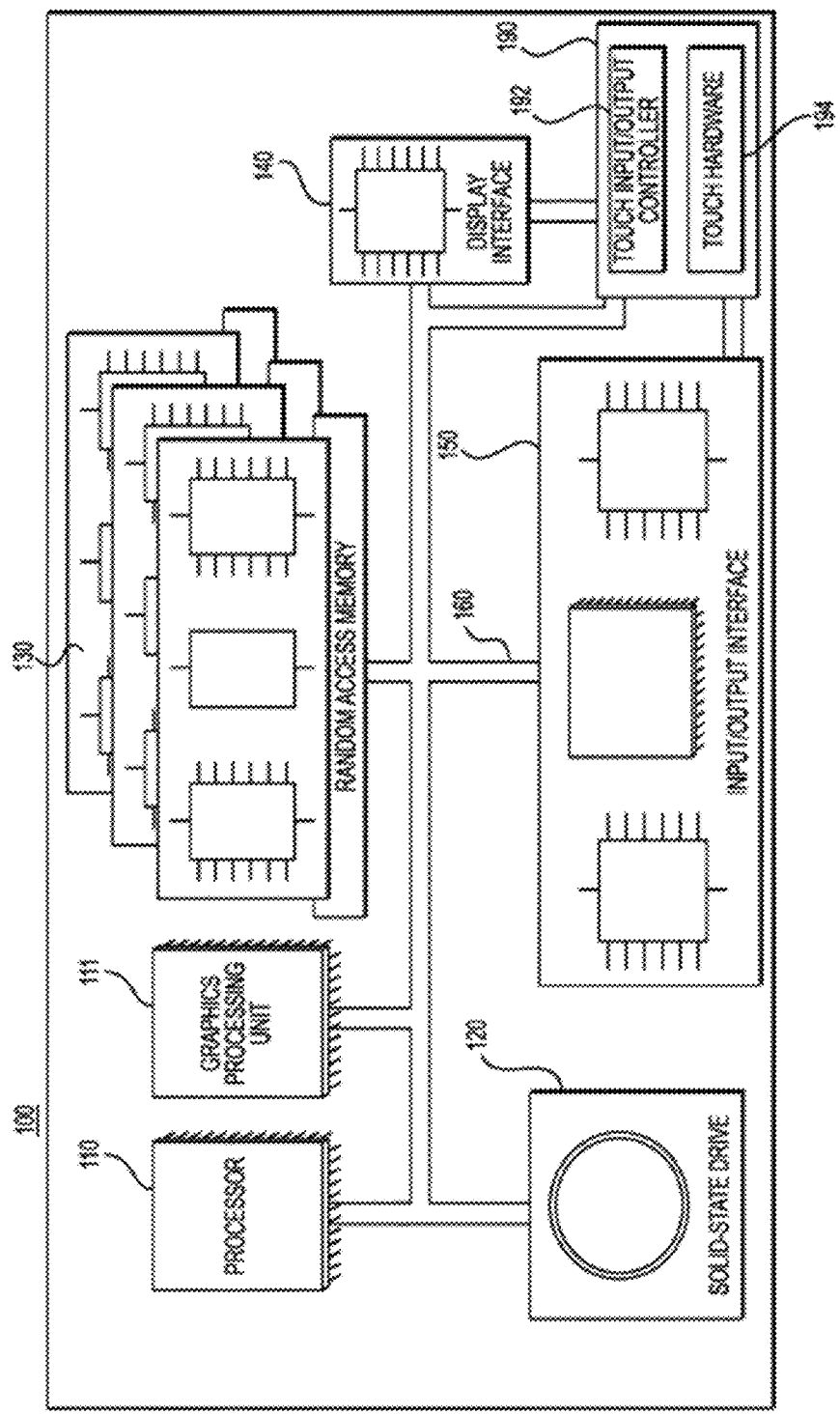
FIG. 5 depicts a schematic diagram of an electronic device in accordance with non-limiting embodiments of the present technology.

Referring to FIG. 5, there is shown an electronic device 100 suitable for use with some implementations of the present technology, the electronic device 100 comprising various hardware components including one or more single or multi-core processors collectively represented by processor 110, a graphics processing unit (GPU) 111, a solid-state drive 120, a random access memory 130, a display interface 140, and an input/output interface 150. The electronic device 100 may be used for executing the method 10 and/or the method 40.

Communication between the various components of the electronic device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the electronic device 100 in addition or in replacement of the touchscreen 190.

According to implementations of the present technology, the solid-state drive 120 stores program instructions suitable for being loaded into the random-access memory 130 and executed by the processor 110 and/or the GPU 111. For example, the program instructions may be part of a library or an application.

The electronic device 100 may be implemented as a server, a desktop computer, a laptop computer, a tablet, a smartphone, a personal digital assistant or any device that may be configured to implement the present technology, as it may be understood by a person skilled in the art.

In one embodiment, the first generator 32, the second generator 34, the optional transformer 36, the combiner 38 and the optional averaging unit are all part of a same electronic device such as a same server. Alternatively, at least two of the units forming the system 30 may be located on a same electronic device while the other unit may be located on at least another electronic device. For example, first generator 32 may be on a first server, the second generator 34 and the transformer 36 may be on a second server and the combiner 38 may be on a third server.

Similarly, the generator 62 and the category determining unit 64 may be on a same electronic device such as a same server. Alternatively the generator 62 and the category determining unit 64 may each be on respective electronic device, such as on different servers.

Each server may be implemented as a conventional computer server and may comprise at least some of the features of the electronic device 100 shown in FIG. 5. In a non-limiting example of an embodiment of the present technology, a server can be implemented as server running the Microsoft™ Windows Server™ operating system. Needless to say, a server can be implemented in any other suitable hardware and/or software and/or firmware or a combination thereof. In the shown non-limiting embodiment of present technology, a server is a single server. In alternative non-limiting embodiments of the present technology, the functionality of a given server may be distributed and may be implemented via multiple servers.

The implementation of a server is well known to the person skilled in the art of the present technology. However, briefly speaking, a server comprises a communication interface (not shown) structured and configured to communicate with various entities via a network. A server further comprises at least one computer processor (e.g., the processor 110 of the electronic device 100) operationally connected with the communication interface and structured and configured to execute various processes to be described herein.

In some embodiments of the present technology such as embodiments comprising a plurality of servers communicating via a telecommunication network, the communication network is the Internet. In alternative non-limiting embodiments, the communication network can be implemented as any suitable local area network (LAN), wide area network (WAN), a private communication network or the like. It should be expressly understood that implementations for the communication network are for illustration purposes only. How a communication link between servers, databases, another electronic device and the communications network is implemented will depend inter alia on how each electronic device is implemented.

Figure 6:
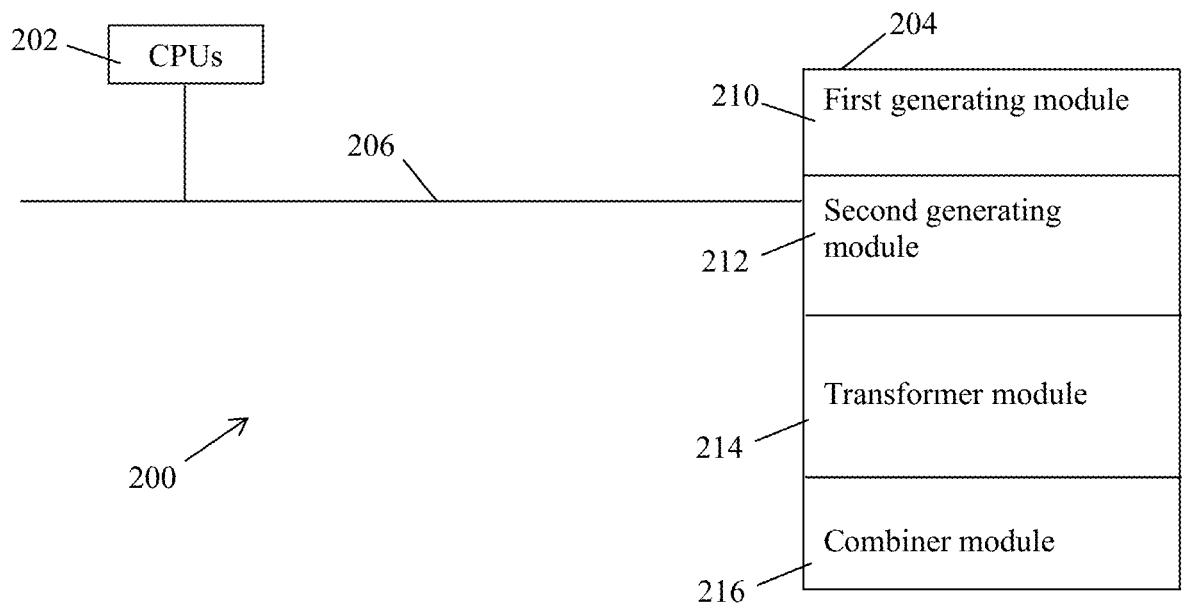
FIG. 6 is a block diagram of a processing module adapted to execute at least some of the steps of the method of FIG. 1, in accordance with an embodiment.

FIG. 6 is a block diagram illustrating an exemplary processing module 400 for executing the steps 12 to 20 of the method 10, in accordance with some embodiments. The processing module 200 typically includes one or more CPUs and/or GPUs 202 for executing modules or programs and/or instructions stored in memory 204 and thereby performing processing operations, memory 204, and one or more communication buses 206 for interconnecting these components. The communication buses 206 optionally include circuitry (sometimes called a chipset) that interconnects and controls communications between system components. The memory 204 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 204 optionally includes one or more storage devices remotely located from the CPU(s) and/or GPUs 202. The memory 204, or alternately the non-volatile memory device(s) within the memory 204, comprises a non-transitory computer readable storage medium. In some embodiments, the memory 204, or the computer readable storage medium of the memory 204 stores the following programs, modules, and data structures, or a subset thereof:

a first generating module 210 for generating vector representations of images;

a second generating module 212 for generating vector representation of semantic information;

a transformer module 214 for transforming vector representation of images or vector representations of semantic information;

a combiner 416 for combining a vector representation of an image and a vector representation of semantic information; and an averaging module (not shown) for averaging vector representations of images.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, the memory 204 may store a subset of the modules and data structures identified above. Furthermore, the memory 204 may store additional modules and data structures not described above.

Although it shows a processing module 200, FIG. 6 is intended more as functional description of the various features which may be present in a management module than as a structural schematic of the embodiments described herein. In practice, and as recognized by those of ordinary skill in the art, items shown separately could be combined and some items could be separated.

Figure 7:
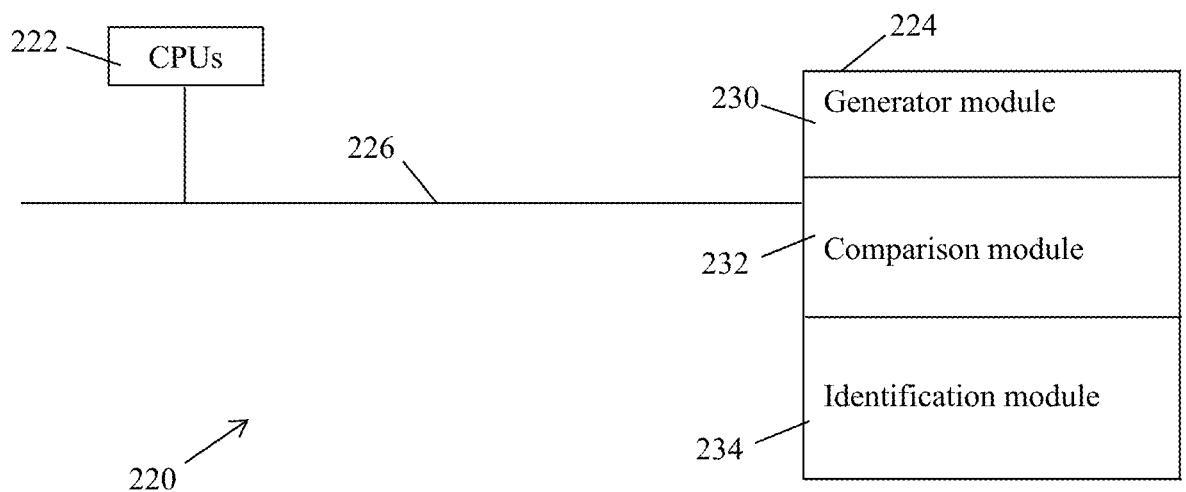
FIG. 7 is a block diagram of a processing module adapted to execute at least some of the steps of the method of FIG. 3, in accordance with an embodiment.

FIG. 7 is a block diagram illustrating an exemplary processing module 420 for executing the steps 42 to 50 of the method 40, in accordance with some embodiments. The processing module 220 typically includes one or more CPUs and/or GPUs 222 for executing modules or programs and/or instructions stored in memory 224 and thereby performing processing operations, memory 204, and one or more communication buses 226 for interconnecting these components. The communication buses 206 optionally include circuitry (sometimes called a chipset) that interconnects and controls communications between system components. The memory 224 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 224 optionally includes one or more storage devices remotely located from the CPU(s) and/or GPUs 222. The memory 224, or alternately the non-volatile memory device(s) within the memory 224, comprises a non-transitory computer readable storage medium. In some embodiments, the memory 224, or the computer readable storage medium of the memory 224 stores the following programs, modules, and data structures, or a subset thereof:

a generator module 230 for generating vector representations of images;

a comparison module 232 for comparing the vector representation of an image to predefined or reference vector representations; and an identification module 234 for identifying a relevant category based on the comparison.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, the memory 224 may store a subset of the modules and data structures identified above. Furthermore, the memory 224 may store additional modules and data structures not described above.

Although it shows a processing module 220, FIG. 7 is intended more as functional description of the various features which may be present in a management module than as a structural schematic of the embodiments described herein. In practice, and as recognized by those of ordinary skill in the art, items shown separately could be combined and some items could be separated.

In the following, there is described an exemplary method for leveraging language structure to improve few-shot image classification. After a brief explanation of episodic training for few-shot learning and a summary of prototypical networks, a description of the proposed adaptive modality mixture mechanism is provided.

1.1. Preliminaries 1.1.1. Episodic Training

In few-shot learning, the interest consists in training a classifier on a labeled dataset $D_{train}$ that generalizes well on a test dataset $D_{test}$. The class sets are disjoint between $D_{train}$ and $D_{test}$. The test set has only a few labeled samples per category. Most successful approaches rely on an episodic training paradigm: the few shot regime faced at test time is simulated by sampling small samples from the large labeled set $D_{train}$ during training.

In general, models are trained on K-shot, N-way episodes. Each episode e is created by first sampling N categories from the training set and then sampling two sets of images from these categories: (i) the support set $S_e = \{(s_i, y_i)\}_{i=1}^{N \times K}$ containing K examples for each of the N categories and (ii) the query set $Q_e = \{(q_j, y_j)\}_{j=1}^Q$, containing different examples from the same N categories.

The episodic training for few-shot classification is achieved by minimizing, for each episode, the loss of the prediction on samples in query set, given the support set. The model is a parameterized function and the loss is the negative loglikelihood of the true class of each query sample:

$$\mathcal{L}(\theta) = \mathbb{E}_{(S_e, Q_e)} - \sum_{i=1}^Q \log p_\theta(y_t | q_t, S_c), \quad (1)$$

where $(q_t, y_t) \in Q_e$ and $S_e$ are, respectively, the sampled query and support set at episode e and $\theta$ are the parameters of the model.

1.1.2. Prototypical Networks

The present model is built on top of metric-based meta-learning methods. A prototypical network is chosen for explaining the present model due to its simplicity. It should however be understood that the present method may potentially be applied to any metric-based approach.

Prototypical networks use the support set to compute a centroid (prototype) for each category (in the sampled episode) and query samples are classified based on the distance to each prototype. The model is a convolutional neural network $f: \mathbb{R}^{n_v} \to \mathbb{R}^{n_p}$, parameterized by $\theta_f$, that learns a np-dimensional space where samples of the same category are close and those of different categories are far apart.

For every episode e, each embedding prototype $p_c$ (of category c) is computed by averaging the embeddings of all support samples of class c:

$$p_c = \frac{1}{|S_e^c|} \sum_{(s_i, y_i) \in S_e^c} f(s_i), \quad (2)$$

where $S_e^c \subset S_e$ is the subset of support belonging to class c. The model produces a distribution over the N categories of the episode based on a softmax over distances d of the embedding of the query $q_t$ (from category c) to the embedded prototypes:

$$p(y = c | q_t, S_c, \theta) = \frac{\exp(-d(f(q_t), p_c))}{\sum_k \exp(-d(f(q_t), p_k))}. \quad (3)$$

d is considered to be the Euclidean distance. The model is trained by minimizing Equation 1 and the parameters are updated with stochastic gradient descent.

1.2. Adaptive Modality Mixture Mechanism

The information contained in semantic concepts can significantly differ from visual information content. For instance, 'Siberian husky' and 'wolf', or 'komondor' and 'mop' might be difficult to discriminate with visual features, but might be easier to discriminate with language semantic features.

In zero-shot learning, where no visual information is given at test time (that is, the support set is void), algorithms need to rely on side information. Current state-of-the-art zero-shot learning methods rely on joint embedding of the image feature space and the class label embedding space. On the other extreme, when the number of labeled image samples is considerable, neural network models tend to ignore the semantic information as it is able to generalize well with large number of samples.

In the few-shot learning scenario, the present method hypothesizes that both visual and semantic information can be useful for classification. Because it is assumed that the visual and the semantic spaces have different structures, it is desirable that the proposed model exploit both modalities in the best way.

We augment prototypical networks to incorporate language structure learned by a language model W (pre-trained on un-supervised large text corpora), containing label embeddings of all categories in $D_{train} \cup D_{test}$. In the present model, the prototype representation of each category is modified by taking into account their label embeddings.

Figure 8:
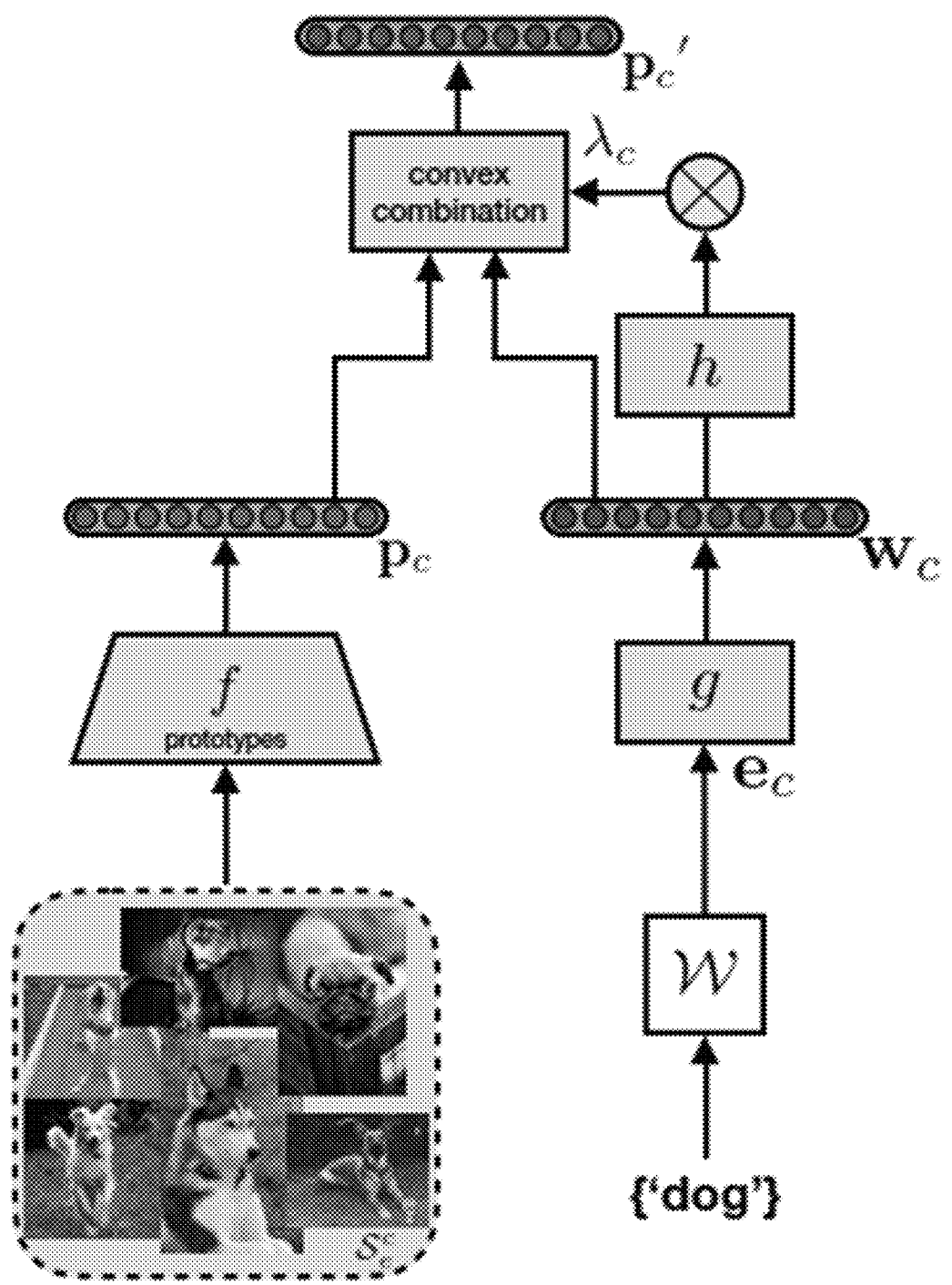
FIG. 8 illustrates an adaptive modality mixture mode in accordance with an embodiment. The final category prototype is a convex combination of the visual and the semantic feature representations. The mixing coefficient is conditioned on the semantic label embedding.

More specifically, the new prototype representation is modeled as a convex combination of the two modalities. That is, for each category c, the new prototype is computed as:

$$p_c' = \lambda_c \cdot p_c + (1 - \lambda_c) \cdot w_c, \quad (4)$$

where $\lambda_c$ is the adaptive mixture coefficient (conditioned on the category) and $w_c = g(e_c)$ is a transformed version of the label embedding for class c. This transformation $g: \mathbb{R}^{n_w} \to \mathbb{R}^{n_p}$, parameterized by $\theta_g$, is important to guarantee that both modalities lie on the same dimensional space $\mathbb{R}^{n_p}$ and can be combined. There are many different ways to adaptively calculate $\lambda_c$ to mix the two modalities. In the present case, it was chosen to condition the mixing coefficient on different categories. However, the person skilled in the art would understand that other approaches may be used. A very structured semantic space may be a good choice for conditioning. Therefore, a simple model for modulation conditioned on the semantic embedding space may be chosen:

$$\lambda_c = \frac{1}{1 + \exp(-h(w_c))}, \quad (5)$$

where h is the adaptive mixing network, with parameters $\theta_h$. FIG. 8 illustrates the proposed model. The mixing coefficient can be conditioned on different variables. In Section 2.3 below, it is shown how performance changes when the mixing coefficient is conditioned on different variables. The training procedure is similar to that of the original prototypical networks. However, the distances d (used to calculate the distribution over classes for every image query) are between the query and the cross-modal prototype $p_c'$:

$$p_\theta(y = c|q_t, \mathcal{S}_c, \mathcal{W}) = \frac{\exp(-d(f(q_t), p_c'))}{\sum_k \exp(-d(f(q_t), p_k'))}, \quad (6)$$

where $\theta = \{\theta_f, \theta_g, \theta_h\}$ is the set of parameters. Once again, the model is trained by minimizing Equation 1. It should however be noted that in this case the probability is also conditioned on the language embeddings W. FIG. 9 illustrates an example of how the proposed method works. Algorithm 1 shows the pseudocode for calculating episode loss.

---

Input: Training set $\mathcal{D}_{train} = \{(x_i, y_i)\}_i$, $y_i \in \{1, ..., M\}$.
$\mathcal{D}_{train}^c = \{(x_i, y_i) \in \mathcal{D}_{train} \mid y_i = c\}$.
Output: Episodic loss $\mathcal{L}(\theta)$ for sampled episode e.
//Select N classes for episode e
C ← RandomSample( {1, ..., M}, N)
//Compute cross-modal prototypes
  for c in C do
    $\mathcal{S}_e^c$ ← RandomSample($\mathcal{D}_{train}^c$, K)
    $\mathcal{Q}_e^c$ ← RandomSample($\mathcal{D}_{train}^c \setminus \mathcal{S}_e^c$, $K_Q$)

$p_c \leftarrow \frac{1}{|\mathcal{S}_e^c|} \sum_{(s_i, y_i) \in \mathcal{S}_e^c} f(s_i)$ $e_c$ ← LookUp(c, $\mathcal{W}$)
    $w_c$ ← $g(e_c)$ $\lambda_c \leftarrow \frac{1}{1 + \exp(-h(w_c))}$ $p_c' \leftarrow \lambda_c \cdot p_c + (1 - \lambda_c) \cdot w_c$
  end for
//Compute loss
$\mathcal{L}(\theta) \leftarrow 0$
for c in C do
  for $(q_t, y_t)$ in $\mathcal{Q}_e^c$ do $\mathcal{L}(\theta) \leftarrow \mathcal{L}(\theta) + \frac{1}{N \cdot K} \left[ d(f(q_t) \cdot p_c')) + \log \sum_k \exp(-d(f(q_t), p_k')) \right]$ end for
end for

---

Figure 9A:
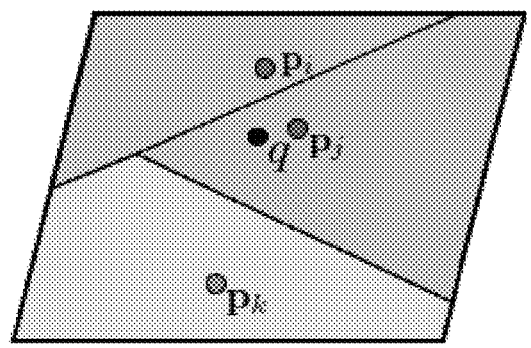
FIG. 9a illustrates the image vector representation of a query and the vector representation associated with three image categories, in accordance with an example.
Figure 9B:
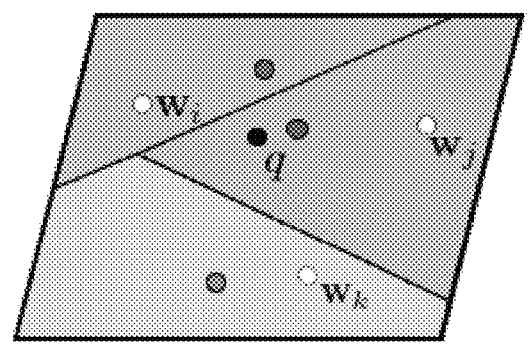
FIG. 9b illustrates the vector representation of semantic information for each of the three image categories of FIG. 9a, in accordance with an example.
Figure 9C:
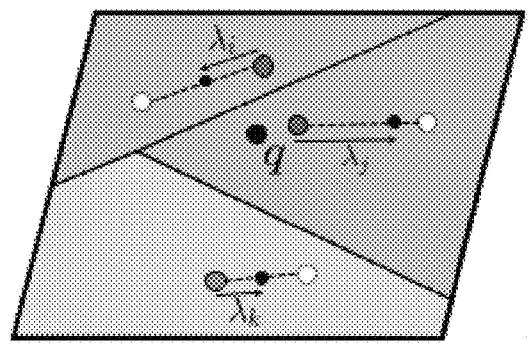
FIG. 9c illustrates the combination of the image vector representation of FIG. 9a and the vector representation of semantic information of FIG. 9b for each one of the three categories, in accordance with an example.
Figure 9D:
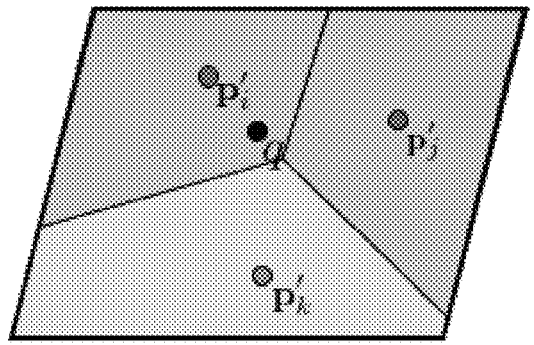
FIG. 9d illustrates the image vector representations resulting from the combination of FIG. 9c for each one of the three categories, in accordance with an example.
Figure 10A:
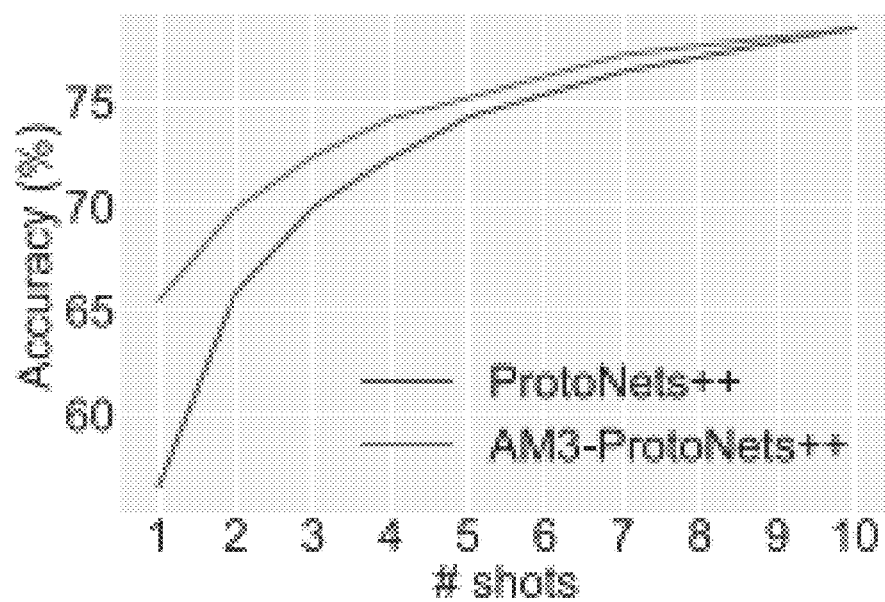
FIG. 10a is an exemplary graph of an accuracy versus a number of shots for AM3 and ProtoNets++.
Figure 10B:
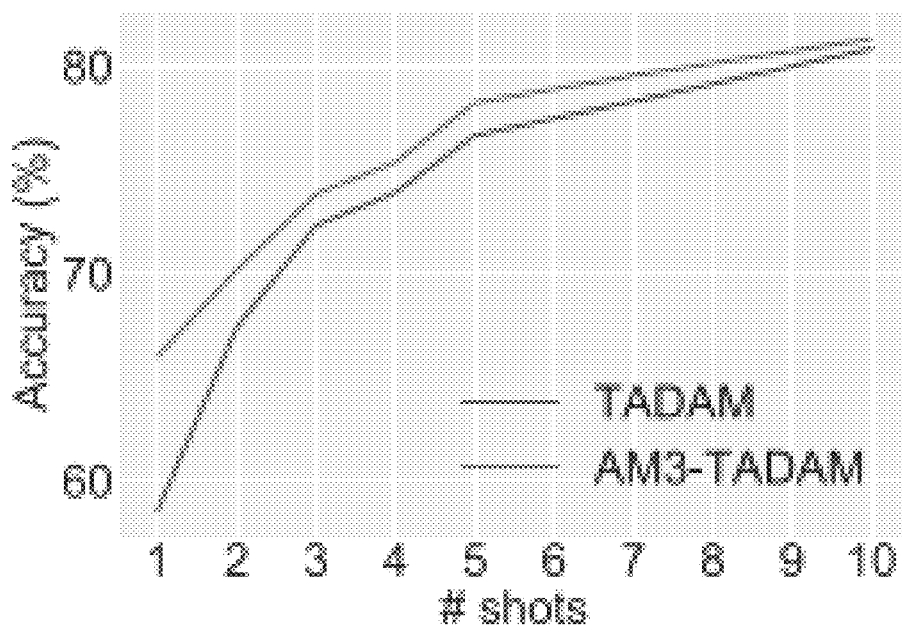
FIG. 10b is an exemplary graph of an accuracy versus a number of shots for AM3 and TADAM.
Figure 10C:
FIG. 10c is an exemplary graph of lambda versus a number of shots for AM3 and ProtoNets++.
Figure 10D:
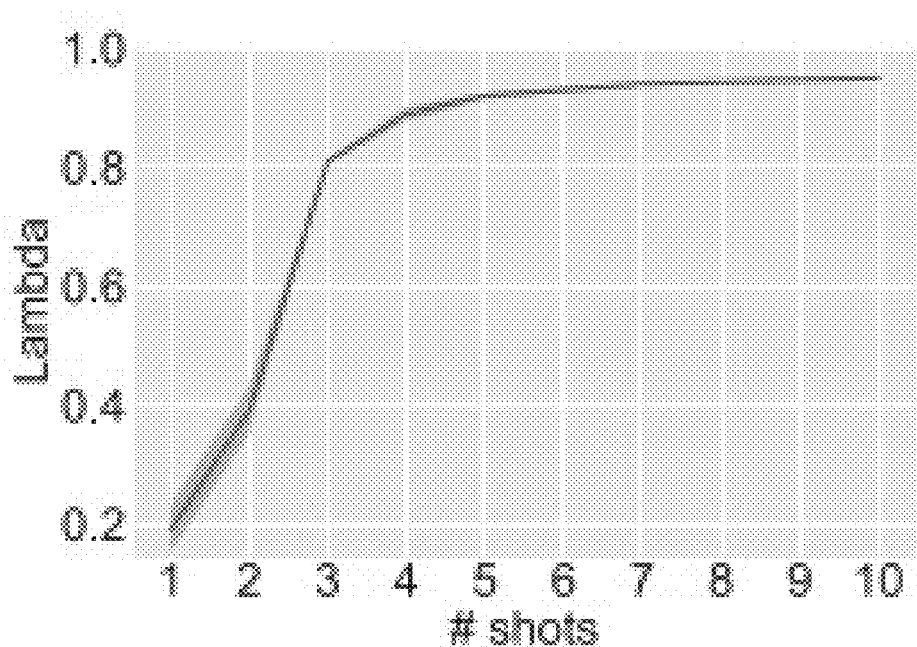
FIG. 10d is an exemplary graph of lambda versus a number of shots for AM3 and TADAM.

In FIG. 9a, there is illustrated the vector representation of a query q and the vector representation of three categories i, j and k, i.e. vector representations $p_i$, $p_j$ and $p_k$. If the present method is not used, the query q would be associated with the category j since q is the closest to $p_j$. FIG. 9b illustrates the vector representations of semantic information $w_i$, $w_j$ and $w_k$ for each category i, j and k. FIG. 9c illustrates the combination of the category vector presentations $p_i$, $p_j$ and $p_k$ with their respective vector representations of semantic information $w_i$, $w_j$ and $w_k$. FIG. 9d illustrates the vector representations $p'_i$, $p'_j$ and $p'_k$ associated with the categories i, j and k and resulting from the combination step of FIG. 9c. As illustrated in FIG. 9d, the vector representation of the query is now the closest to the vector representation $p'_i$ and the image of the query is therefore associated with the category i.

2. Experiments

In the following, there is described the experimental setup including datasets, different cross-modal baselines and implementation details. Then, the performance of the present model, hereinafter referred to as adaptive modality mixture mechanism (AM3), is compared with other methods on the problem of few-shot classification. Finally, a series of ablation studies is performed to better understand the model.

2.1. Experimental Setup 2.1.1. Datasets

Experiments were performed with two widely used few-shot learning datasets: miniImageNet (Vinyals et al., 2016) and tieredImageNet (Ren et al., 2018).

MiniImageNet.

This dataset is a subset of ImageNet ILSVRC12 dataset. It contains 100 randomly sampled categories, each with 600 images of size 84×84. For fair comparison with other methods, a split which contains 64 categories for training, 16 for validation and 20 for test is used.

TieredImageNet.

This dataset is a larger subset of ImageNet than miniImageNet. It contains 34 high-level category nodes (779,165 images in total) that are split in 20 for training, 6 for validation and 8 for test. This leads to 351 actual categories for training, 97 for validation and 160 for the test. There are more than 1,000 images for each class. The train/val/test split is done according to their higher-level label hierarchy. Splitting near the root of ImageNet hierarchy results in a more realistic (and challenging) scenario with training and test categories that are less similar.

Word Embeddings.

GloVe is used to extract the semantic embeddings for the category labels. GloVe is an unsupervised approach based on word-word co-occurrence statistics from large text corpora. The Common Crawl version trained on 840B tokens is used. The embeddings are of dimension 300. When it has multiple (synonym) annotations, a category is considered as the first one. If the first one is not present in GloVe's vocabulary, then the second one is used. If there is no annotation in GloVe's vocabulary for a category (4 cases in tieredImageNet), each dimension of the embedding is randomly sampled from a uniform distribution with the range (−1, 1). If an annotation contains more than one word, the embedding is generated by averaging them.

2.1.2. Baselines

Current state of the art in few-shot learning relies on visual embeddings only. In the present case, four baselines that leverage cross-modal embeddings in different ways are introduced.

ProtoNets++-MBR.

The first baseline is a natural cross-modal extension of prototypical networks, borrowing ideas from zero-shot learning literature. The visual embedding space is forced to keep a structure similar to the semantic space. This is achieved by adding a metric-based regularization (MBR) term to the loss of the original prototypical network (Equation 1):

$$\frac{\exp(-d(e_c, p_c))}{\sum_k \exp(-d(e_c, p_k))}. \quad (7)$$

In the preliminary experiment this regularization with the transformed semantic space (features w) has been tried while it performed worse.

ProtoNets++-MMD.

This baseline learns cross-modal embeddings with a maximum mean discrepancy (MMD)-based regularizer. This approach forces the visual and textual feature distributions to match. This regularization seems to be more effective (at least in some tasks) than the metric-based one.

ProtoNets++-CMC.

Here, a constant mixture coefficient (CMC) is considered to disentangle the effectiveness of the adaptive component of the proposed mechanism. $\lambda_c$ is set at 0.5 for all categories c.

TADAM-CBNlabel.

Some few-shot classification methods learn a metric space that is conditioned by each task, using visual features as the auxiliary meta-information and conditional batch norm (CBN). Inspired by these approaches (and the first use of CBN), the third baseline is a version of TADAM with its CBN conditioned on GloVe embeddings instead of its original task encoding.

2.1.3. Implementation Details

The visual feature extractor f is modeled with a ResNet-12, which has shown to be very effective for few-shot classification. This network produces embeddings of dimension 512. This backbone is used in the 4 baselines mentioned above and in AM3 implementations. The prototypical network implementation with this more powerful backbone is referred to as ProtoNets++ hereinafter.

The semantic transformation g is a neural network with one hidden layer with 300 units which also outputs a 512-dimensional representation. The transformation h of the mixture mechanism also contains one hidden layer with 300 units and outputs a single scalar for $\lambda_c$. On both g and h networks, ReLU non-linearity and dropout are used (the dropout coefficient is set to be 0.7 on miniImageNet and 0.9 on tieredImageNet).

The model is trained with stochastic gradient descent with momentum. An initial learning rate of 0.1 and a fixed momentum coefficient of 0.9 are used. On miniImageNet, every model is trained for 30,000 iterations and the learning rate is annealed by a factor of ten at iterations 15,000, 17,500 and 19,000. On tieredImageNet, models are trained for 80,000 iterations and the learning rate is reduced by a factor of ten at iteration 40,000, 50,000, 60,000.

The training procedure composes a few-shot training batch from several tasks, where a task is a fixed selection of five classes. It was found empirically that the best number of tasks per batch are 5, 2 and 1 for 1-shot, 5-shot and 10-shot, respectively. The number of query per batch is 24 for 1-shot, 32 for 5-shot and 64 for 10-shot. All the present experiments are evaluated following the standard approach of few-shot classification: 1,000 tasks from the test set each having 100 random query samples were randomly sampled, and the performance of the model was averaged on them.

All hyperparameters were chosen based on the accuracy on validation set. All results are reported with an average over five independent run (with a fixed architecture and different random seeds) and with 95% confidence intervals.

2.2. Comparison to Other Methods

Table 1 and Table 2 show classification accuracy on miniImageNet and on tieredImageNet, respectively. In the top part of each table, there is shown recent methods exploiting only visual features. The cross-modality baselines described in Section 2.1.2 is shown in the middle part and results of the present method, AM3, are shown at the bottom with two different backbone architectures: ProtoNets++ and TADAM.

TABLE 1

Few-shot classification accuracy on test split of miniImageNet.
Results in the top use only visual features.
Cross-modal baselines are shown on the middle and
our results (and their backbones) on the bottom part.

| | Test Accuracy | | |
|---|---|---|---|
| Model | 1-shot | 5-shot | 10-shot |
| Matching Network | 43.56 ± 0.84% | 55.31 ± 0.73% | — |
| Prototypical Network | 49.42 ± 0.78% | 62.20 ± 0.66% | 74.30 ± 0.52% |
| Discriminative k-shot | 56.30 ± 0.40% | 73.90 ± 0.30% | 78.50 ± 0.00% |
| Meta-Learner LSTM | 43.44 ± 0.77% | 60.60 ± 0.71% | — |
| Meta-SGD | 50.47 ± 1.87% | 64.03 ± 0.94% | — |
| MAML | 48.70 ± 1.84% | 63.11 ± 0.92% | — |
| Proto. Nets w Soft k-Means | 50.41 ± 0.31% | 69.88 ± 0.20% | — |
| SNAIL | 55.71 ± 0.99% | 68.80 ± 0.92% | — |
| CAML | 59.23 ± 0.99% | 72.35 ± 0.71% | — |
| LEO | 61.76 ± 0.08% | 77.59 ± 0.12% | — |
| ProtoNets++ MBR | 56.99 ± 0.08% | 72.63 ± 0.72% | 76.70 ± 0.53% |
| ProtoNets++ MMD | 57.23 ± 0.76% | 73.85 ± 0.63% | 77.21 ± 0.31% |
| ProtoNets++ -CMC | 57.63 ± 0.71% | 66.23 ± 0.45% | 68.59 ± 0.38% |
| TADAM -CBNlbel | 57.17 ± 0.32% | 77.35 ± 0.30% | 80.46 ± 0.44% |
| ProtoNets++ | 56.52 ± 0.45% | 74.28 ± 0.20% | 78.61 ± 0.44% |
| AM3-ProtNets++ | 65.21 ± 0.30% | 75.20 ± 0.27% | 78.52 ± 0.28% |
| TADAM | 58.56 ± 0.39% | 76.65 ± 0.38% | 80.83 ± 0.37% |
| AM3-TADAM | 65.30 ± 0.49% | 78.10 ± 0.36% | 81.57 ± 0.47% |

TABLE 2

Few-shot classification accuracy on test split of miniImageNet.
Results in the top use only visual features.
Cross-modal baselines are shown in the middle and results of
the present method (and their backbones) in the bottom part.

| | Test Accuracy | |
|---|---|---|
| Model | 1-shot | 5-shot |
| MAML[1] | 51.67 ± 1.81% | 70.30 ± 0.08% |
| Proto. Nets with Son k-Means | 53.31 ± 0.89% | 72.69 ± 0.74% |
| Relation Net[1] | 54.48 ± 0.93% | 71.32 ± 0.78% |
| Transdoctive Prop. Nets | 54.48 ± 0.93% | 71.32 ± 0.78% |
| LEO | 66.33 ± 0.05% | 81.44 ± 0.09% |
| ProtNets++ -MBR | 61.78 ± 0.43% | 77.17 ± 0.81% |
| ProtoNets++ -MMD | 62.77 ± 0.31% | 77.27 ± 0.42% |
| ProtoNets++ -CMC | 61.52 ± 0.93% | 68.23 ± 0.23% |
| TADAM -CBMlabel | 62.74 ± 0.63% | 81.94 ± 0.55% |
| ProtoNets++ | 58.47 ± 0.64% | 78.41 ± 0.41% |
| AM3-ProtoNets++ | 62.89 ± 0.34% | 78.95 ± 0.22% |
| TADAM | 62.13 ± 0.31% | 81.92 + 0.30% |
| AM3-TADAM | 69.08 ± 0.47% | 82.58 ± 0.31% |

Multiple results may be concluded from these experiments. First, the present method outperforms its backbone methods by a large margin in all cases tested. This indicates that language (i.e. semantic information) can be effectively leveraged to boost performance in classification with low number of shots.

Second, AM3 (with TADAM backbone) achieves results superior to current (single modality) state of the art. The margin in performance is particularly remarkable in the 1-shot scenario. Although the present approach exploits semantic embeddings, it should be noted that they were learned with unlabeled text corpora.

Finally, it is shown that no cross-modal baseline described in Section 2.1.2 outperforms current uni-modal state of the art. This indicates that exploiting semantic information in few-shot learning is not a trivial task. ProtoNets++-MBR and ProtoNets++-MMD (extension of methods deployed in zero-shot learning to metric based few-shot learning) does not help in this situation. It is argued that the reason might be that they force the two modalities to have the same structure, which can cause information loss. By comparing the performance of ProtoNets++ and ProtoNets++-CMC, it may be concluded that an adaptive mixture mechanism is important to leverage semantic features.

In summary, the present method boosts the performance of metric-based algorithms and beats state-of-the-art methods for few-shot learning. This is achieved by adaptively exploiting visual and semantic information, while other cross-modal baselines fail to do so. In both backbone architectures tested, ProtoNets++ and TADAM, the present model is able to achieve much better performance when compared to the base methods, particularly when the number of shots is reduced.

2.3. Ablation Studies 2.3.1. Number of Shots

FIG. 7(a-b) shows the accuracy of the present model compared to the two backbones tested (ProtoNets++ and TADAM) on miniImageNet for 1-10 shot scenarios. It is clear from the plots that the gap between AM3 and the corresponding backbone gets reduced as the number of shots increases.

FIG. 7(c-d) shows the mean and std (over whole validation set) of the mixing coefficient $\lambda$ for different shots and back-bones. It may be observed that $\lambda$ keeps increasing as the number of shots increases. This means that AM3 weighs more on semantic information (and less on visual one) as the number of shots (hence the number of visual data points) decreases.

These trends corroborate that semantic representations get more useful as the number of support images decreases, since the visual support information gets reduced in such cases. It also indicates that AM3 can automatically learn the importance of both information sources in different scenarios.

2.3.2. Adaptive Mechanism

An ablation study is also performed to see how the adaptive mechanism performs with respect to different features. Table 3 shows results, on both datasets, of the present method with three different inputs for the adaptive mixing network: (i) the raw GloVe embedding (h(e)), (ii) the visual representation (h(p)) and (iii) a concatenation of both the query and the language embedding (h(q, w)).

TABLE 3

Performance of the present method when the adaptive mixing network is conditioned on different features. Last row is the original model.

| Method | ProtoNets++ | | TADAM | |
|---|---|---|---|---|
| | 1-shot | 5-shot | 1-shot | 5-shot |
| h(e) | 61.23 | 74.77 | 57.47 | 72.27 |
| h(p) | 64.48 | 74.80 | 64.93 | 77.60 |
| h(w, q) | 66.12 | 75.83 | 53.23 | 56.70 |
| h(w) (AM3) | 65.21 | 75.20 | 65.30 | 78.10 |

It may be observed that conditioning on transformed GloVe features performs better than on the raw features. Also, conditioning on semantic features performs better than when conditioning on visual ones, suggesting that the former space has a more appropriate structure to the adaptive mechanism than the latter. Finally, it may be noted that conditioning on the query and semantic embeddings helps with the ProtoNets++ backbone but not with TADAM.

The embodiments of the invention described above are intended to be exemplary only. The scope of the invention is therefore intended to be limited solely by the scope of the appended claims.

We claim:

1. A computer-implemented method for generating a vector representation of an image, the computer-implemented method comprising:
   receiving a given image and semantic information about the given image;
   generating a first vector representation of the given image using an image embedding method, the first vector representation lying in a visual metric space;
   generating a second vector representation of the semantic information using a word embedding method, the second vector representation lying in a semantic space;
   performing a convex combination of the first vector representation of the given image and the second vector representation of the semantic information, thereby obtaining a modified vector representation for the given image, the modified vector representation lying in the visual metric space; and
   outputting the modified vector representation.

2. The computer-implemented method of claim 1, wherein said generating the first vector representation of the given image is performed using a convolutional neural network model.

3. The computer-implemented method of claim 1, wherein said generating the second vector representation is performed using a language model being pre-trained on unsupervised text corpora.

4. The computer-implemented method of claim 3, wherein said generating the second vector representation of the semantic information is performed using a fully connected neural network model.

5. The method of claim 1, wherein said performing the convex combination of the first vector representation of the given image and the second vector representation of the semantic information comprises using an adaptive mixture coefficient conditioned on a category of the second vector representation in the semantic space.

6. The method of claim 1, further comprising, when the semantic space has a size different from the visual metric space: applying a transformation to the second vector representation of the semantic information to obtain a transformed vector representation of the semantic information, the transformed vector representation lying on a space of the same dimension as the visual metric space; and wherein said performing a convex combination comprises performing a convex combination of the first vector representation and the transformed vector representation.

7. The computer-implemented method of claim 6, wherein said applying the transformation is performed using a fully connected neural network model.

8. A system for generating a vector representation of an image, the system comprising:
   a non-transitory storage medium comprising computer-readable instructions; and
   a processor operatively connected to the non-transitory storage medium,
   the processor, upon executing the computer-readable instructions, being configured for:
   receiving a given image and generating a first vector representation of the given image using an image embedding method, the first vector representation lying in a visual metric space;
   receiving semantic information about the given image and generating a second vector representation of the semantic information using a word embedding method, the second vector representation lying in a semantic space; and a combiner for combining performing a convex combination of the first vector representation of the given image and the second vector representation of the semantic information to obtain a modified vector representation for the given image and outputting the modified vector representation, the modified vector representation lying in the visual metric space.

9. The system of claim 8, wherein the processor is configured for generating the first vector representation of the given image using a convolutional neural network.

10. The system of claim 8, wherein the processor is configured for generating the second vector representation using a language model being pre-trained on unsupervised text corpora.

11. The system of claim 10, wherein the processor is configured to use a fully connected neural network.

12. The system of claim 8, wherein said performing the convex combination of the first vector representation of the given image and the second vector representation of the semantic information comprises using an adaptive mixture coefficient conditioned on a category of the second vector representation in the semantic space.

13. The system of claim 8, wherein said processor is further configured for: when the semantic space has a size different from the visual metric space: applying a transformation to the second vector representation of the semantic information to obtain a transformed vector representation of the semantic information, the transformed vector representation lying on a space of the same dimension as the visual metric space; and wherein said performing a convex combination comprises performing a convex combination of the first vector representation and the transformed vector representation.

14. The system of claim 13, wherein said applying a transformation to the second vector representation of the semantic information to obtain a transformed vector representation of the semantic information comprises using a fully connected neural network.

* * * * *